US008223686B2

(12) United States Patent
Cho et al.

(10) Patent No.: US 8,223,686 B2
(45) Date of Patent: Jul. 17, 2012

(54) APPARATUS AND METHOD FOR HYBRID AUTOMATIC REPEAT REQUEST SIGNALING IN BROADBAND WIRELESS COMMUNICATION SYSTEM (75) Inventors: Min-Hee Cho, Suwon-si (KR); Jung-Je Son, Seongnam-si (KR); Nam-Gi Kim, Suwon-si (KR); Jae-Hyuk Jang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1097 days.

(21) Appl. No.: 12/025,943

(22) Filed: Feb. 5, 2008

(65) Prior Publication Data
US 2008/0186886 A1 Aug. 7, 2008

(30) Foreign Application Priority Data
Feb. 5, 2007 (KR) .................. 10-2007-0011508

(51) Int. Cl.
*H04B 7/204* (2006.01)

(52) U.S. Cl. ........................................ 370/319
(58) Field of Classification Search .......... 370/310–350; 455/39, 68, 69
See application file for complete search history.

(56) References Cited

U.S. PATENT DOCUMENTS

| 6,549,784 | B1* | 4/2003 | Kostic et al. ................ 455/501 |
| 2003/0123470 | A1 | 7/2003 | Kim et al. |
| 2003/0210669 | A1 | 11/2003 | Vayanos et al. |
| 2008/0062944 | A1* | 3/2008 | Smith et al. ................ 370/342 |
| 2008/0187136 | A1* | 8/2008 | Zhang et al. ................ 380/270 |
| 2009/0022098 | A1* | 1/2009 | Novak et al. ................ 370/329 |

FOREIGN PATENT DOCUMENTS

| JP | 2006-217242 | 8/2006 |
| KR | 1020060015198 | 2/2006 |
| KR | 1020060018403 | 3/2006 |
| KR | 1020060124379 | 12/2006 |
| WO | WO 2005/006640 | 1/2005 |

* cited by examiner

*Primary Examiner* — Hassan Kizou
*Assistant Examiner* — Charles C Jiang
(74) *Attorney, Agent, or Firm* — The Farrell Law Firm, P.C.

(57) ABSTRACT

An apparatus and method for Hybrid Automatic Repeat reQuest (HARQ) signaling in a broadband wireless communication system are provided. A communication method of a Base Station (BS) includes transmitting a Fixed Allocation (FA) message containing bitmap index information for all Mobile Stations (MSs) allocated with fixed resources; and transmitting bitmap information indicating whether packets to be transmitted to the MSs are Retransmission (Rtx) packets or new packets. Accordingly, when HARQ is carried out using a fixed resource allocation scheme, a bitmap is used to indicate whether HARQ packets transmitted in a current frame are new packets or Rtx packets. Therefore, a receiving end can be prevented from incorrectly decoding the packets.

32 Claims, 6 Drawing Sheets

APPARATUS AND METHOD FOR HYBRID AUTOMATIC REPEAT REQUEST SIGNALING IN BROADBAND WIRELESS COMMUNICATION SYSTEM

PRIORITY

This application claims priority under 35 U.S.C. §119(a) to a Korean patent application filed in the Korean Intellectual Property Office on Feb. 5, 2007 and assigned Serial No. 2007-11508, the disclosure of which is hereby incorporated by reference.

BACKGROUND OF THE INVENTION

1. Field of the Invention

The present invention generally relates to an apparatus and method for performing Hybrid Automatic Repeat reQuest (HARQ) in a broadband wireless communication system. More particularly, the present invention relates to an apparatus and method for HARQ signaling when fixed resource allocation is carried out in a broadband wireless communication system.

2. Description of the Related Art

In a next generation communication system, also known as a $4^{th}$ Generation (4G) communication system, researches are actively in progress to provide users with services with various Quality of Service (QoS) requirements at a data transfer speed of about 100 Mbps (Megabits per second). In particular, the 4 G communication system is currently being developed to ensure mobility and QoS in a Broadband Wireless Access (BWA) communication system, such as a wireless Local Area Network (LAN) system, a wireless Metropolitan Area Network (MAN) system, etc. Examples of such a communication system include an Institute of Electrical and Electronics Engineers (IEEE) 802.16 communication system, an IEEE 802.20 communication system, etc.

An IEEE 802.16 communication system and an IEEE 802.20 communication system use an Orthogonal Frequency Division Multiplexing (OFDM)/Orthogonal Frequency Division Multiple Access (OFDMA) scheme. In addition, an IEEE 802.20 communication system supports a scheme in which a wireless resource is fixedly allocated to a specific Mobile Station (MS), and this scheme will be referred to herein as a fixed resource allocation scheme or fixed allocation. It is expected that future IEEE 802.16m communication systems will also support the fixed resource allocation scheme.

The fixed resource allocation scheme reduces overhead that occurs when resource allocation information (or a resource allocation message) is transmitted to an MS for each frame. That is, a Base Station (BS) periodically allocates specific resources to the MS in a fixed manner while the MS receives a service that periodically generates traffic. Thereafter, the MS performs communication by continuously using the fixed allocated resources without having to verify the resource allocation information until the fixed allocated resources are modified or released. Therefore, the BS does not have to transmit the resource allocation information to the MS for each frame.

However, when a Hybrid Automatic Repeat reQuest (HARQ) packet is transmitted by using the fixed allocated resources, packet loss and delay may occur due to an erroneous response signal for the HARQ packet.

For example, assume that an MS is successfully received a HARQ packet and thus transmits an ACKnowledgement (ACK) signal as a response signal, but a BS recognizes a Non-ACKnowledgement (NACK) signal as the response signal due to errors.

In this case, since the MS has successfully received the pervious packet, the MS deletes the previous packet from a receiving buffer, and then waits for a new packet. However, since the BS has recognized the NACK signal as the response signal, the BS retransmits the previous packet, which leads to unnecessary packet retransmission. In addition, since the MS regards a currently received packet as the new packet and does not perform symbol-combining, there is an increasing possibility of unsuccessful packet reception. If packet reception has failed, the MS transmits the NACK signal as the response signal, and the BS retransmits the previous packet. As such, the BS retransmits the packet several times even when the packet has already been successfully received by the MS, resulting in waste of wireless resources.

For another example, assume that an MS fails to receive a HARQ packet and thus transmits a NACK signal as a response signal, but a BS recognizes an ACK signal as the response signal due to errors.

In this case, since the MS fails to receive the previous packet, the MS waits for retransmission of the previous packet. However, since the BS has recognized the ACK signal as the response signal, the BS transmits a new packet to the MS. Then, the MS regards the new packet as the previous packet, and performs demodulation by symbol-combining the new packet with the previous packet stored in a receiving buffer. Since the two combined packets are different from each other, the MS determines that the packet reception has failed, and transmits the NACK signal to the BS again as the response signal. In response to the NACK signal, the BS retransmits the new packet, and the MS continues to fail in receiving the packet. As a result, the MS fails to receive both the previous packet and the new packet, and thus both of the two packets are lost. In addition, packet retransmission is repeated up to a maximum number of times, resulting in waste in wireless resources. Moreover, delay may occur when another packet is transmitted.

Accordingly, a need exists for a technique for enhancing reliability of signaling when HARQ is performed by using fixed allocated resources.

SUMMARY OF THE INVENTION

The present invention substantially addresses at least the above-mentioned problems and/or disadvantages and provides at least the advantages described below. Accordingly, an aspect of the present invention is to provide an apparatus and method for enhancing reliability of HARQ signaling in a broadband wireless communication system.

Another aspect of the present invention is to provide an apparatus and method for enhancing reliability of signaling when HARQ is performed by using fixed allocated resources in a broadband wireless communication system.

Another aspect of the present invention is to provide an apparatus and method for reducing overhead resulting from signaling when HARQ is performed by using fixed allocated resources in a broadband wireless communication system.

According to an aspect of the present invention, a communication method of a BS in a broadband wireless communication system is provided. The method includes transmitting a Fixed Allocation (FA) message containing bitmap index information for all MSs allocated with fixed resources; and transmitting bitmap information indicating whether packets to be transmitted to the MSs are Retransmission (Rtx) packets or new packets.

According to another aspect of the present invention, a communication method of an MS in a broadband wireless communication system is provided. The method includes receiving, from a BS, bitmap information indicating whether packets received by using fixed allocated resources are Rtx packets or new packets; and determining whether a packet received in a current frame is an Rtx packet or a new packet by verifying a bit value of a bitmap index allocated to the MS.

According to another aspect of the present invention, a BS apparatus in a broadband wireless communication system is provided. The apparatus includes a first generator for generating an FA message containing bitmap index information for all MSs allocated with fixed resources; a second generator for transmitting bitmap information indicating whether packets to be transmitted to the MSs are Rtx packets or new packets; and a transmitter for transmitting messages received from the first generator and the second generator by performing physical layer encoding according to a scheduling result.

According to another aspect of the present invention, an MS apparatus in a broadband wireless communication system is provided. The apparatus includes a receiver for receiving bitmap information indicating whether packets received by using fixed allocated resources are Rtx packets or new packets; and a bitmap information reader for determining whether a packet received in a current frame is an Rtx packet or a new packet by verifying a bit value of a bitmap index allocated to the MS according to the bitmap information received from the receiver.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on intention and usage of a user or operator. That is, the terms used herein must be understood based on the descriptions made herein.

The present invention will now be described which effectively performs Hybrid Automatic Repeat reQuest (HARQ) signaling when HARQ is performed by using fixed allocated resources in a broadband wireless communication system.

Although a Broadband Wireless Access (BWA) communication system employing an Orthogonal Frequency Division Multiplexing (OFDM) scheme or an Orthogonal Frequency Division Multiple Access (OFDMA) scheme will be described below as an example, the present invention is not limited thereto. Thus, the present invention may also apply to another communication system employing a different scheme (e.g., a Code Division Multiple Access (CDMA) scheme, etc.).

HARQ uses several schemes such as a Chase Combining (CC) scheme and an Incremental Redundancy (IR) scheme. In the following description, the chase combining scheme for retransmitting the same packet will be explained for example. However, the present invention is not limited thereto, and thus may also apply to another HARQ employing a different scheme.

The present invention provides a message in a form of bitmap for identifying whether a HARQ packet transmitted by a Base Station (BS) is a new packet or a Retransmission (Rtx) packet when HARQ is performed by using fixed allocated resources. Such a bitmap will be referred to herein as a New/Rtx bitmap. A bitmap index is allocated to each user. For example, a first bit of the bitmap is allocated to a first user, a second bit of the bit map is allocated to a second user, and in this manner, a last bit of the bitmap is allocated to a last user.

In general, a resource allocation message used in fixed resource allocation, referred to herein as a Fixed Allocation (FA) message, is transmitted once in a frame which fixed resource allocation is started. The FA message of the present invention includes not only information on fixed allocation resources but also information on a bitmap index allocated to a specific user.

Table 1 below shows an example of the FA message. The FA message may be included as one Information Element (IE) in a DownLink (DL)-MAP message.

TABLE 1

| Field | Description |
|---|---|
| ... | |
| Number of fixed allocation, Nf | number of fixed allocations |
| For(i=0;i<Nf;i++) | |
|   MAC ID | user ID |
|   Slot offset | slot offset of allocated wireless resource |
|   No. of slots | number of slots of allocated wireless resource |
|   New/Rtx Bitmap Index | bitmap index |
|   Duration | duration of resource occupation |
|   TF | modulation and coding scheme |
| ... | |
| } | |

As shown in Table 1 above, the FA message may include a "Media Access Control (MAC) IDentification (ID)" which is a user ID assigned for each fixed allocation, a "Slot offset" which indicates a start point of an allocated wireless resource, a "No. of slots" which indicates the number of slots of the allocated wireless resources, a "New/Rtx Bitmap Index" which indicates a bitmap index allocated to a corresponding user, a "Duration" which indicates a time duration for allocating a fixed resource, and a "TF" which indicates a modulation and coding scheme applied to the fixed allocated resource. Although now shown in detail in Table 1 above, in addition thereto, the FA message may include a start frame which fixed resource allocation is started, an FA period, etc. As such, a user (or a Mobile Station (MS)) can identify a bitmap index allocated to that user by using the FA message.

Figure 1:
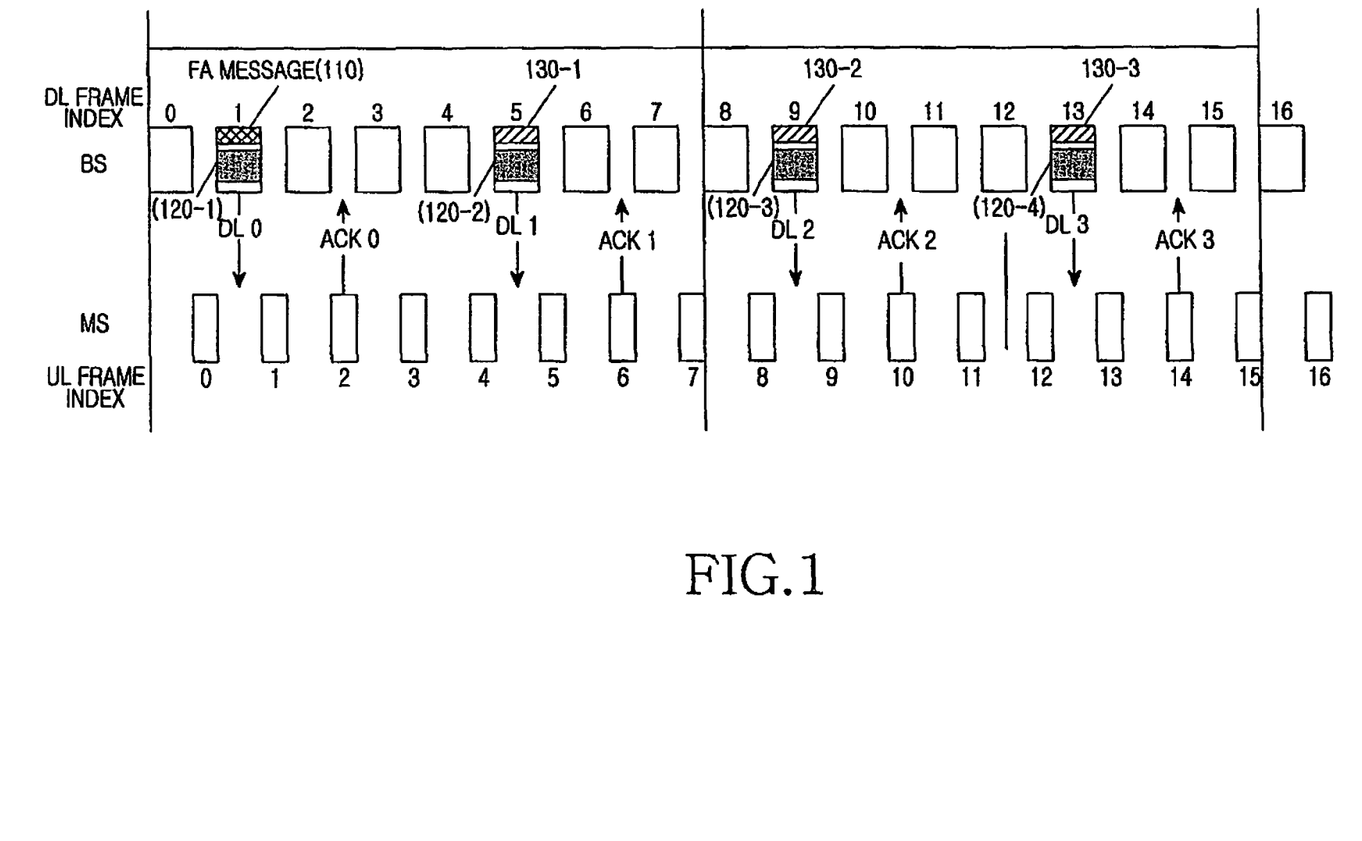
FIG. 1 illustrates an example of operating fixed resource allocation in a broadband wireless communication system according to the present invention.

FIG. 1 shows an example of operating fixed resource allocation in a broadband wireless communication system according to the present invention.

Referring to FIG. 1, a Base Station (BS) transmits an FA message 110 in a frame which fixed resource allocation is started, and then periodically delivers HARQ traffic to an MS by using fixed resources 120-1 to 120-4 at a particular period. In FIG. 1, the fixed resources are allocated with a period of 4 frames. In this case, the MS feeds back to the BS an ACKnowledgement (ACK) or Non-ACKnowledgement (NACK) signal for indicating a success or failure of receiving the periodically delivered traffic. As such, the BS and the MS perform communication by continuously using fixed allocated resources until the fixed allocated resources are modified or released. That is, the BS does not have to transmit resource allocation information to the MS for each frame.

According to the present invention, the BS transmits a retransmission indication message in a broadcast region (or a control region) of a frame which a HARQ packet is transmitted. The retransmission indication message contains bitmap information which indicates whether the HARQ packet transmitted in a current frame is a new packet or an Rtx packet. As shown in FIG. 1, the BS periodically transmits the retransmission indication messages 130-1 to 130-3 containing the bitmap information at the same period as the HARQ packet transmission period. The retransmission indication messages 130-1 to 130-3 may be an IE included in the MAP message or may be an additional MAC management message transmitted in a data transmission region. In the latter case, the position of the MAC management message may be informed by using the MAP message. The MS receives the retransmission indication message in a frame which the HARQ packet is received. Then, the MS verifies a value of a bit allocated to the MS in the bitmap information included in the retransmission indication message. Thus, the MS can determine whether the currently received HARQ packet is the new packet or the Rtx packet.

Figure 2:
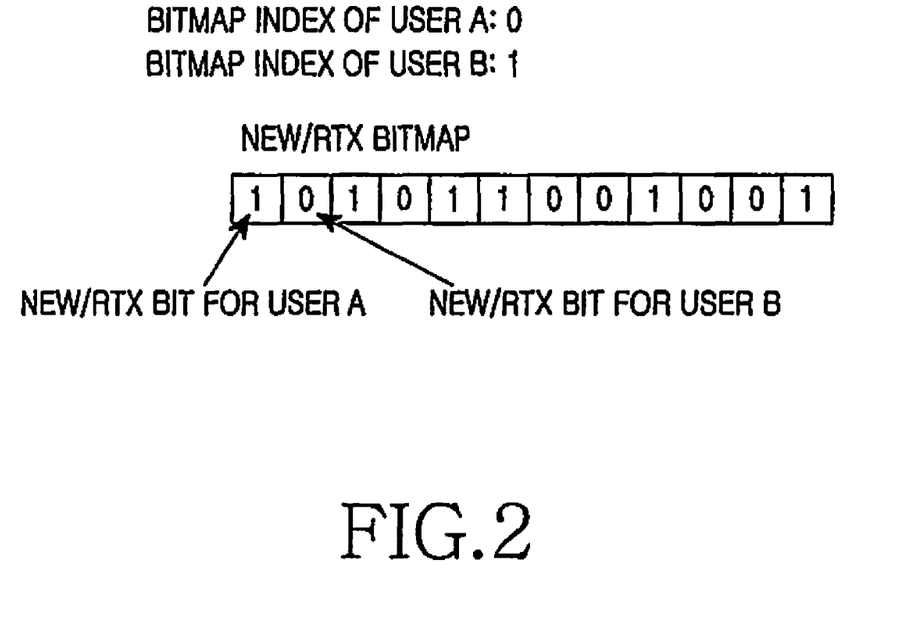
FIG. 2 illustrates an example of a bitmap indicating whether a currently received packet is a new packet or a retransmission packet according to the present invention.

FIG. 2 shows an example of New/Rtx bitmap information according to the present invention.

Referring to FIG. 2, a bitmap has a specific length which may be fixed or variable. A first bit of the bitmap is allocated to a user A. A second bit of the bitmap is allocated to a user B. A New/Rtx bit for user A is '1'. A New/Rtx bit for user B is '0'.

Regarding user A, when the New/Rtx bit for the user A is 1, if information on an immediately previously received bitmap indicates '1', a HARQ packet received in a current frame is an Rtx packet, and if the information on the immediately previously received bitmap indicates '0', the HARQ packet received in the current frame is a new packet. That is, an MS compares information on the currently received bitmap with information on the previously received bitmap, and if the two pieces of information are identical, determines that the currently received packet is the Rtx packet, and if the two pieces of information are different from each other, determines that the currently received packet is the new packet.

Likewise, regarding user B, if information on an immediately previously received bitmap indicates '0', a currently received HARQ packet is determined to be an Rtx packet, and if the information on the immediately previously received bitmap indicates '1', the currently received HARQ packet is determined to be a new packet. Meanwhile, it is possible to modify a correspondence relationship between a user and a bitmap. When modification occurs, this is reported to MSs.

As such, when the bitmap is used to indicate whether a packet is an Rtx packet or a new packet, an MS can correctly determine whether a currently received packet is the Rtx packet or the new packet, with a small overhead (i.e., one bit for each fixed allocated resource).

Figure 3:
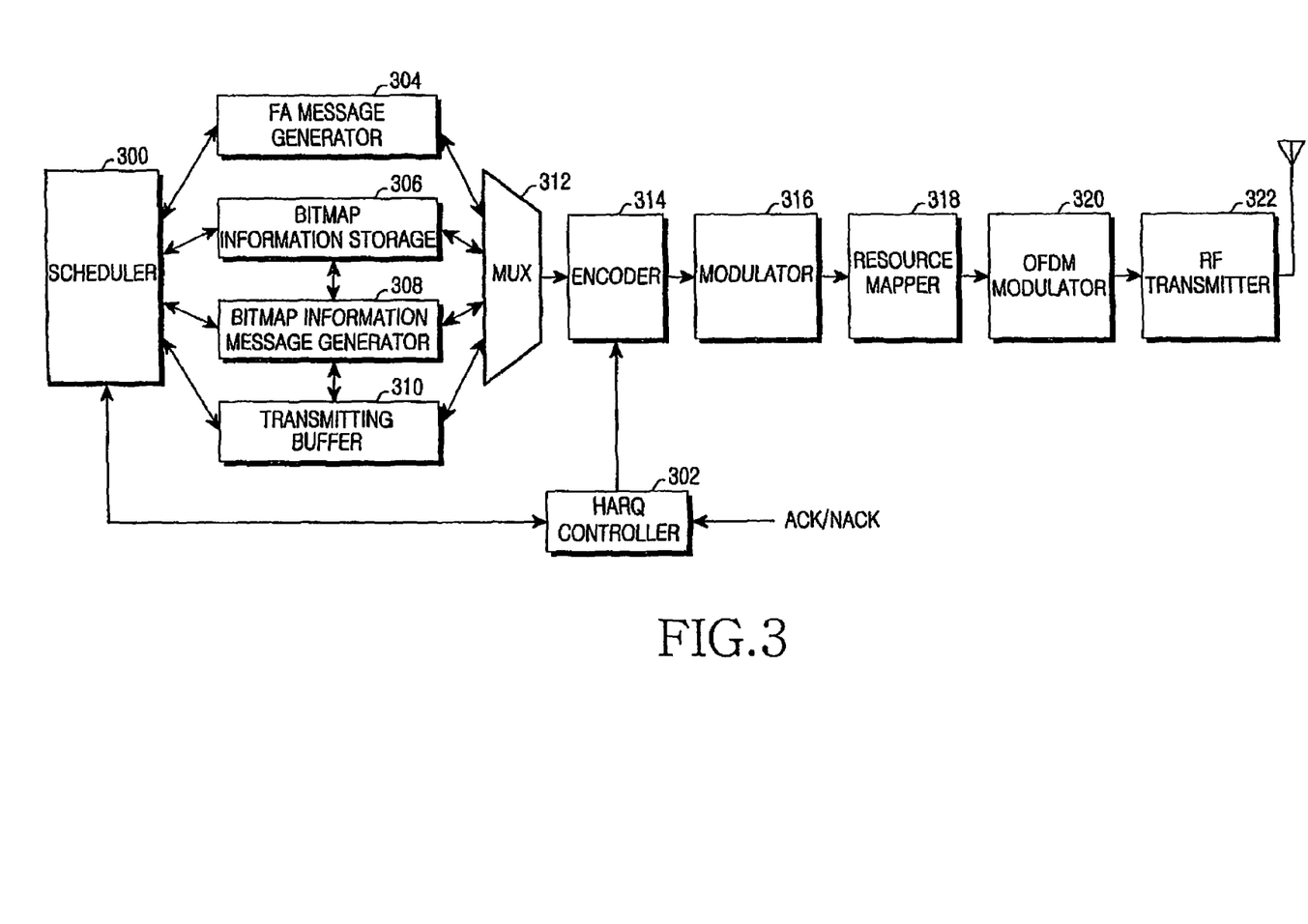
FIG. 3 is a block diagram illustrating a BS in a broadband wireless communication system according to the present invention.

FIG. 3 shows a BS in a broadband wireless communication system according to the present invention.

Referring to FIG. 3, the BS includes a scheduler 300, a HARQ controller 302, an FA message generator 304, a bitmap information storage 306, a bitmap information message generator 308, a transmitting buffer 310, a multiplexer (or MUX) 312, an encoder 314, a modulator 316, a resource mapper 318, an OFDM modulator 320, and a Radio Frequency (RF) transmitter 322.

The scheduler 300 performs resource scheduling for each frame, and controls relevant elements according to the scheduling result. In particular, according to the present invention, the scheduler 300 controls overall operations of FA as shown in FIG. 1. That is, the scheduler 300 controls generation and transmission of various control signals (e.g., FA message, bitmap information message, etc.) transmitted for the FA operation, and also controls packet transmission/reception for the FA operation.

The FA message generator 304 generates an FA message as shown in Table 1 above according to the scheduling result of the scheduler 300, and outputs the generated FA message to the MUX 312 at a specific transmission time. The FA message is transmitted in a start frame which fixed resource allocation is started, and may be included as an Information Element (IE) in a MAP message.

The bitmap information storage 306 stores bitmap information generated according to the scheduling result of the scheduler 300, as shown in FIG. 2. A plurality of bits constitute the bitmap, and are one-to-one mapped to a plurality of MSs allocated with fixed resources. Such an MS will be referred herein to as a Fixed Allocation (FA)-MS. An initial bitmap may be initialized to all '1' or '0'. For every transmission, the bitmap information storage 306 updates the bitmap under the control of the scheduler 300. For example, a specific bit of the bitmap is toggled if a HARQ packet transmitted to an FA-MS in a current frame is a new packet, but this bit is maintained without alteration if the HARQ packet is an Rtx packet.

At every transmission time in accordance with an FA period, the bitmap information message generator 308 reads the bitmap information from the bitmap information storage 306 and generates a bitmap information message. That is, the bitmap information message is periodically transmitted at the same period as the FA period.

The transmitting buffer 310 buffers data to be transmitted to the MSs, and outputs the data to the MUX 312 under the control of the scheduler 300. The data buffered in the transmitting buffer 310 may be a Packet Data Unit (PDU) of an MAC layer.

The multiplexer 312 delivers data generated by various elements in the MAC layer to a physical layer according to the scheduling result.

The encoder 314 of the physical layer encodes the data (or burst) generated by the MUX 312 and thus generates an encoded packet. According to the present invention, the encoder 314 buffers a HARQ packet (i.e., encoded packet) to be transmitted to the FA-MS. Further, under the control of the HARQ controller 302, the encoder 314 retransmits the buffered HARQ packet or a new HARQ packet. For example, the encoder 314 may use a Convolutional Code, a Turbo Code, a Convolutional Turbo Code, a Low Density Parity Check (LDPC) code, etc.

The modulator 316 modulates the packet encoded by the encoder 314 according to a suitable modulation scheme, and thus generates modulated symbols. For example, the modulator 316 may use Quadrature Phase Shift Keying (QPSK), 16Quadrature Amplitude Modulation (QAM), 64QAM, etc.

The resource mapper 318 maps the data modulated by the modulator 316 to a particular resource. According to the present invention, at every transmission time in accordance with the FA period, the resource mapper 318 maps data to be transmitted to the FA-MS to the fixed resource.

The OFDM modulator 320 performs OFDM modulation on the data mapped to the resource by the resource mapper 318, and thus generates OFDM symbols. The OFDM modulation includes Inverse Fast Fourier Transform (IFFT) operation, Cyclic Prefix (CP) insertion, etc. The RF transmitter 322 converts sample data provided from the OFDM modulator 320 into an analog signal, converts the analog signal to an RF signal, and transmits the RF signal through an antenna.

The HARQ controller 302 evaluates a respond signal (i.e., ACK/NACK) fed back from the FA-MS, and determines whether a next packet to be transmitted to the FA-MS is a new packet or an Rtx packet according to the response signal. The HARQ controller 302 provides information, which indicates whether the next packet is a new packet or an Rtx packet, to the scheduler 300 and the encoder 314. This information will be referred to herein as New/Rtx information. Then, the scheduler 300 uses the New/Rtx information in a scheduling operation, and updates a specific bit of the bitmap according to the New/Rtx information. Further, according to the New/Rtx information, the encoder 314 discards or retransmits the buffered HARQ packet.

As described above, according to the present invention, the FA message is transmitted once in a start frame which fixed resource allocation is started, and the bitmap information message (or retransmission indication message) is periodically transmitted at the same period as the packet transmission period (or FA period).

Figure 4:
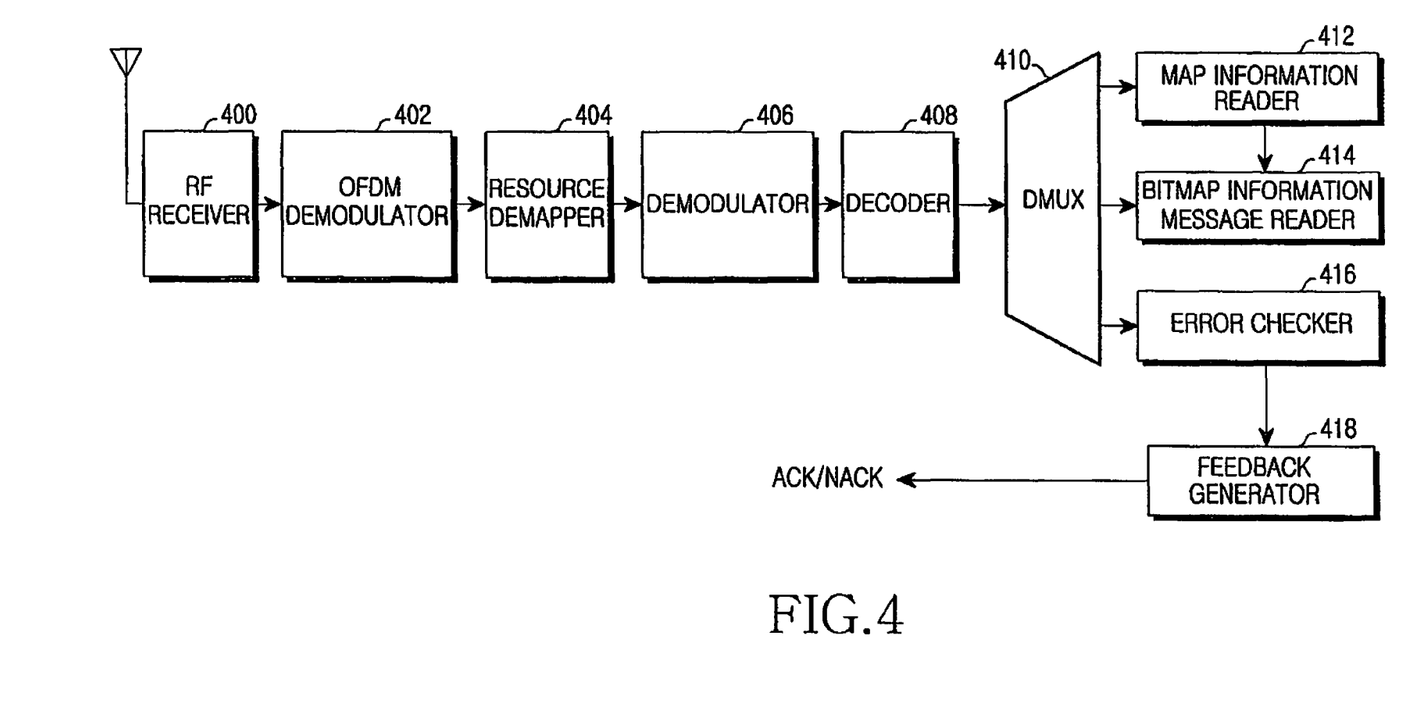
FIG. 4 is a block diagram illustrating an MS in a broadband wireless communication system according to the present invention.

FIG. 4 shows an MS in a broadband wireless communication system according to the present invention.

Referring to FIG. 4, the MS includes an RF receiver 400, an OFDM demodulator 402, a resource demapper 404, a demodulator 406, a decoder 408, a demultiplexer (DMUX) 410, a MAP information reader 412, a bitmap information message reader 414, an error checker 416, and a feedback generator 418.

The RF receiver 400 converts an RF signal received through an antenna into a baseband signal, and converts the baseband signal into digital sample data. The OFDM demodulator 402 performs OFDM demodulation on the sample data converted by the RF receiver 400 to output frequency-domain data. The OFDM demodulation includes CP removal, Fast Fourier Transform (FFT), etc.

From the frequency-domain data output from the OFDM demodulator 402, the resource demapper 404 extracts data (or burst data) to be demodulated. According to the present invention, at every transmission time in accordance with an FA period, the resource demapper 404 extracts data mapped to fixed resources.

The demodulator 406 demodulates the data output from the resource demapper 404. The decoder 408 decodes the data demodulated by the demodulator 406. In this case, if a currently received packet is a new packet, the decoder 408 performs decoding by using only the new packet, and if the currently received packet is an Rtx packet, the decoder 408 performs decoding by combining the currently received packet with a previously received packet. Whether the currently received packet is an Rtx packet can be verified by using bitmap information received in a current frame.

The demultiplexer 410 delivers to relevant elements the data output from the decoder 408 according to a data type. Specifically, the demultiplexer 410 delivers the data to the MAP information reader 412 if the data output from the decoder 408 is a MAP message, delivers the data to the bitmap information message reader 414 if the data is a bitmap information message, and delivers the data to the error checker 416 if the data is traffic.

The MAP information reader 412 reads the MAP message output from the demultiplexer 410, and controls overall transmitting/receiving operations of the MS according to the reading result. If the FA message (i.e., MAP_IE) is included in a MAP message, the MAP information reader 412 determines an FA duration, an FA period, an FA resource, and a bitmap index, and then controls FA communication of the MS according to the determination result.

The bitmap information message reader 414 reads the bitmap information message output from the demultiplexer 410, and compares a value of a bit, which is allocated to the MS and is included in the bitmap, with a value of a bit included in an immediately previously received bitmap. The value of the bit (i.e., bitmap index) allocated to the MS is received from the MAP information reader 412. If the currently received bit value is different from the immediately previously received bit value, the bitmap information message reader 414 determines that a packet received in a current frame is a new packet, and if the currently received bit value is identical to the immediately previously received bit value, determines that the packet received in the current frame is an Rtx packet. New/Rtx information on the currently received packet is provided to the decoder 408. The decoder 408 can determine whether to combine packets according to the New/Rtx information.

The error checker 416 checks if the HARQ packet (i.e., decoded data) output from the demultiplexer 410 has an error. For example, the error checker 416 may perform error checking by using Cyclic Redundancy Check (CRC). Further, the error checker 416 provides the error checking result to the feedback generator 418 and the decoder 408. Then, the decoder 408 discards or buffers a packet according to the error checking result.

The feedback generator 418 generates an ACK or NACK signal according to the error checking result of the error checker 416, and feeds back the generated signal to a BS.

Figure 5:
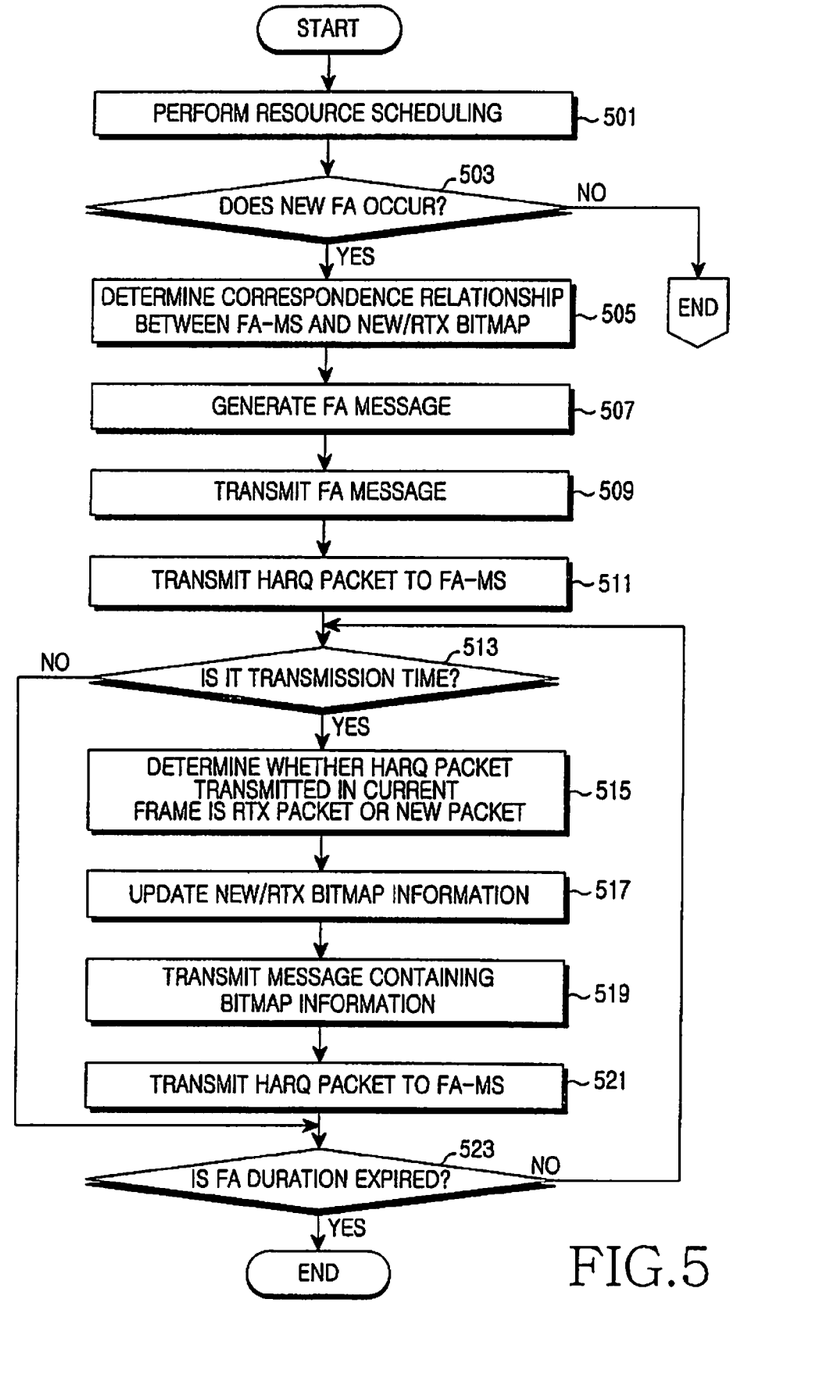
FIG. 5 is a flowchart illustrating an operation of a BS in a broadband wireless communication system according to the present invention.

FIG. 5 shows an operation of a BS in a broadband wireless communication system according to the present invention.

Referring to FIG. 5, the BS performs resource scheduling in step 501. In step 503, the BS determines if a new FA takes place. If an FA takes place, in step 505, the BS determines a correspondence relationship between FA-MSs determined through the scheduling and a New/Rtx bitmap, and then generates New/Rtx bitmap information. Bits of the New/Rtx bitmap are initialized to an initial value.

In step 507, the BS generates an FA message as shown in Table 1 above. As described above, the FA message includes information on a bitmap index allocated to each FA-MS. In step 509, the BS transmits the generated FA message in a start frame which fixed resource allocation is started. The FA message may be transmitted prior to the start frame.

In step 511, the BS transmits HARQ packets to the FA-MSs. The HARQ packets are transmitted by mapping to corresponding fixed resources in a data transmission region included in the start frame.

As such, initial transmission is completed for each FA-MS. Then, in step 513, the BS determines if it is a packet transmission time in accordance with an FA period. If it is not the packet transmission time, proceeding to step 523, the BS determines if an FA duration is expired. Otherwise, if it is the packet transmission time, proceeding to step 515, the BS determines whether the HARQ packets transmitted in a current frame are new packets or Rtx packets. Whether the HARQ packets transmitted in the current frame are new packets or Rtx packets may be determined by a response signal (ACK or NACK) for an immediately previously transmitted packet.

In step 517, the BS updates the New/Rtx bitmap information on the basis of the determination result of step 515. If the HARQ packet transmitted to a specific FA-MS is a new packet, a corresponding bit of the bitmap information is toggled, and otherwise, the bit is maintained without alteration.

In step 519, the BS generates a retransmission indication message containing the bitmap information, and broadcasts the retransmission indication message to the FA-MSs. In step 521, the BS transmits the HARQ packets to the FA-MSs. The HARQ packets are transmitted by mapping to corresponding fixed resources in a data transmission region included in the current frame.

In step 523, the BS determines if the FA duration for each FA-MS is expired. If the FA duration expires, the procedure of FIG. 5 ends, and otherwise, returning back to step 513, the BS checks for a next packet transmission time. The FA duration may be concurrently expired for all FA-MSs. However, the FA duration may be individually controlled for the respective FA-MSs.

Figure 6:
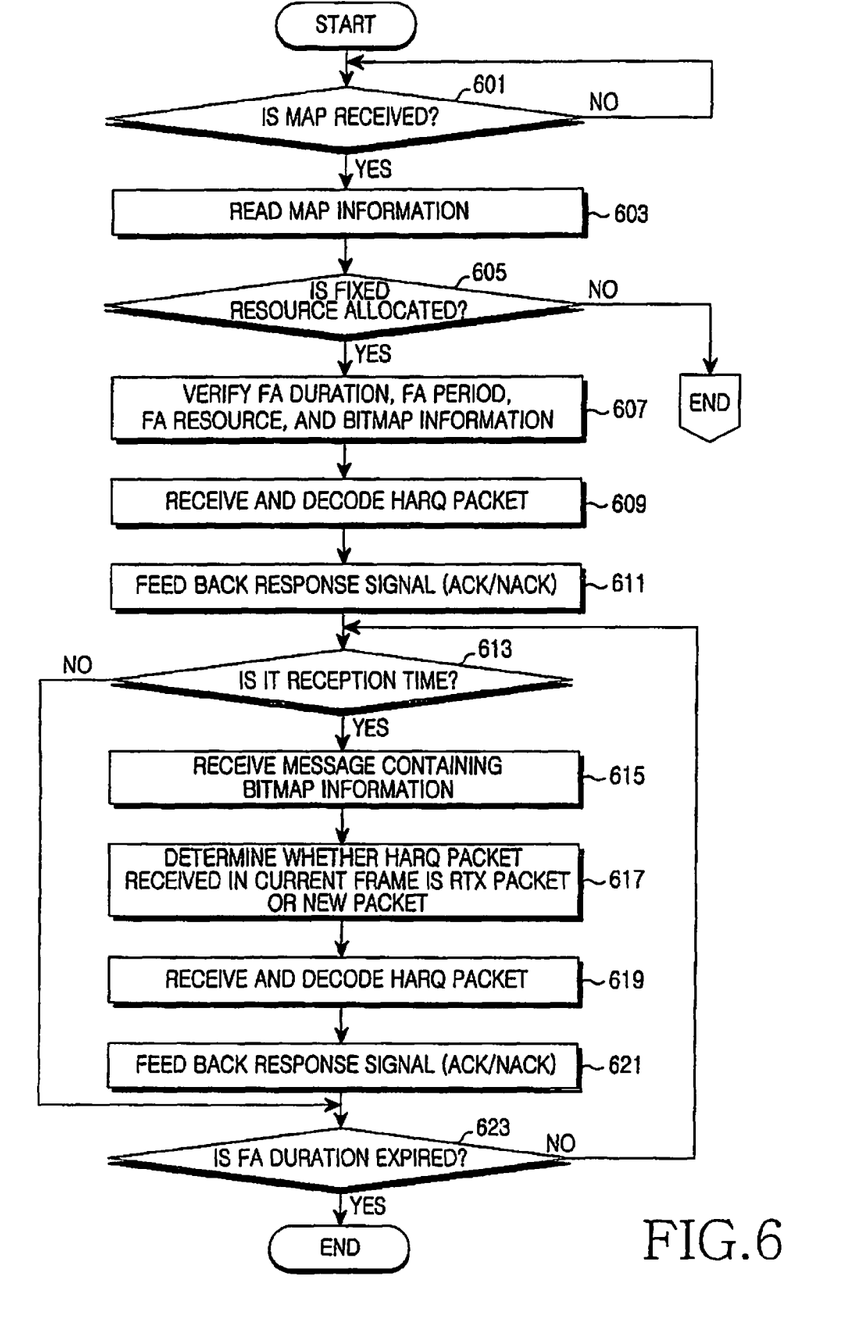
FIG. 6 is a flowchart illustrating an operation of an MS in a broadband wireless communication system according to the present invention.

FIG. 6 shows an operation of an MS in a broadband wireless communication system according to the present invention.

Referring to FIG. 6, the MS detects a MAP message broadcast from a BS in step 601. Upon detecting a MAP message, in step 603, the MS reads the received MAP message and verifies a DownLink (DL)/UpLink (UL) resource allocation state. That is, the MS reads the MAP message and thus recognizes allocated DL/UL resources.

In step 605, the MS determines if the reading result shows that a fixed resource is allocated. If the fixed resource is allocated, the MS verifies an FA duration, an FA period, an FA resource, and a New/Rtx bitmap index in step 607.

As such, when communication is ready, in step 609, the MS receives and decodes a HARQ packet by using fixed allocated resources. Since this is initial reception, the MS performs decoding without symbol-combining. In step 611, the MS performs error checking (e.g., Cyclic Redundancy Check (CRC)) by using the decoding result, and feeds back to the BS a response signal (i.e., ACK or NACK) according to the error checking result.

In step 613, the MS determines if it is a packet reception time in accordance with the FA period. If it is not the packet reception time, proceeding to step 623, the MS determines if the FA duration expires. Otherwise, if it is the packet reception time, proceeding to step 615, the MS receives a retransmission indication message containing bitmap information. In step 617, the MS analyzes the retransmission indication message and determines whether a packet received in a current frame is a new packet or an Rtx packet.

In step 619, the MS receives and decodes a HARQ packet by using the fixed allocated resources. According to the determination result of step 617, the MS can decode the received HARQ packet by combining the currently received HARQ packet with the previously received HARQ packet. In step 621, the MS performs error checking according to the decoding result, and feeds back a response signal (i.e., ACK or NACK) to the BS according to the error checking result.

In step 623, the MS determines if the FA duration is expired. If the FA duration expires, the procedure of FIG. 6 ends. Otherwise, if the FA duration is not expired, returning to step 613, the MS checks for a next packet reception time.

According to the present invention, when HARQ is carried out using a fixed resource allocation scheme, a bitmap is used to indicate whether HARQ packets transmitted in a current frame are new packets or Rtx packets. Thus, a receiving end can be prevented from incorrectly decoding the packets. Therefore, there is an advantage in that erroneous response signals for the HARQ packets can be avoided, thereby preventing packet loss. That is, reliability of HARQ signaling can be enhanced with a small overhead by using a bitmap.

While the invention has been shown and described with reference to certain preferred embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A communication method of a Base Station (BS) in a broadband wireless communication system, the method comprising:

transmitting, by the BS, a Fixed Allocation (FA) message including bitmap index information for Mobile Stations (MSs) allocated with fixed resources, wherein the bitmap index information identifies a bitmap index allocated by the BS to an MS among the MSs, and the bitmap index identifies information for the MS from among bitmap information indicating whether packets to be transmitted to the MSs are Retransmission (Rtx) packets or new packets; and transmitting the bitmap information to the MSs.

2. The method of claim 1, wherein the FA message is transmitted in a start frame which fixed resource allocation is started.

3. The method of claim 1, wherein the FA message comprises at least one of an MS IDentification (ID), a region of a fixed resource, the bitmap index allocated to the MS, a coding scheme applied to the fixed resource, a duration for allocating the fixed resource, a start frame which fixed resource allocation is started, and an FA period.

4. The method of claim 1, wherein the transmitting of bitmap information comprises:

at every transmission time in accordance with an FA period, determining whether the packets to be transmitted to the MSs in a current frame are the Rtx packets or the new packets;

toggling a corresponding bit of the bitmap information, when the packets transmitted in the current frame are new packets;

maintaining the corresponding bit of the bitmap information without alternation, when the packets are the Rtx packets; and transmitting an updated bitmap in the current frame.

5. The method of claim 1, further comprising, at every transmission time in accordance with an FA period, transmitting the packets to the MSs by using the fixed resources.

6. The method of claim 5, further comprising:
evaluating a response signal fed back from the MSs; and
determining whether a next packet to be transmitted to a corresponding MS is a new packet or an Rtx packet according to the response signal.

7. The method of claim 1, wherein the packets to be transmitted to the MSs are Hybrid Automatic Repeat reQuest (HARQ) packets.

8. A communication method of a Mobile Station (MS) in a broadband wireless communication system, the method comprising:
receiving, from a Base Station (BS), a Fixed Allocation (FA) message including bitmap index information for the MS allocated with fixed resources, wherein the bitmap index information identifies a bitmap index allocated by the BS to the MS, and the bitmap index identifies information for the MS from among bitmap information indicating whether packets to be transmitted to the MS are Retransmission (Rtx) packets or new packets;
receiving, from the BS, the bitmap information; and
determining whether a packet received in a current frame is an Rtx packet or a new packet by verifying a bit value of the bitmap index allocated to the MS in the bitmap information.

9. The method of claim 8, wherein the bitmap information is periodically received at a Fixed Allocation (FA) period.

10. The method of claim 8, wherein the FA message is transmitted in a start frame which fixed resource allocation is started.

11. The method of claim 8, wherein the FA message comprises at least one of an MS IDentification (ID), a region of a fixed resource, the bitmap index allocated to the MS, a coding scheme applied to the fixed resource, a duration for allocating the fixed resource, a start frame which fixed resource allocation is started, and an FA period.

12. The method of claim 8, wherein determining whether the packet received in the current frame is the Rtx packet or the new packet comprises:
verifying the bit value of the bitmap index allocated to the MS;
determining the packet received in the current frame to be the Rtx packet, when the verified bit value is identical to a previous received bit value; and
determining the packet received in the current frame to be the new packet, when the verified bit value is different from the previous received bit value.

13. The method of claim 8, further comprising:
performing decoding by combining the currently received packet with a previous received packet, when the currently received packet is determined to be the Rtx packet; and
performing decoding by using only the currently received packet, when the currently received packet is determined to be the new packet.

14. The method of claim 13, further comprising:
performing error checking according to the decoding result; and
feeding back the error checking result to the BS.

15. The method of claim 8, wherein the packets received via the fixed resources are Hybrid Automatic Repeat reQuest (HARQ) packets.

16. The method of claim 8, further comprising, at every transmission time in accordance with an FA period, receiving a packet from the BS via a fixed resource.

17. A Base Station (BS) apparatus in a broadband wireless communication system, the apparatus comprising:
a first generator for generating a Fixed Allocation (FA) message including bitmap index information for Mobile Stations (MSs) allocated with fixed resources, wherein the bitmap index information identifies a bitmap index allocated by the BS to an MS among the MSs, and the bitmap index identifies information for the MS from among bitmap information indicating whether packets to be transmitted to the MSs are Retransmission (Rtx) packets or new packets;
a second generator for transmitting bitmap information; and
a transmitter for transmitting messages received from the first generator and the second generator by performing physical layer encoding according to a scheduling result.

18. The apparatus of claim 17, wherein the transmitter transmits the FA message in a frame which fixed resource allocation is started.

19. The apparatus of claim 17, wherein the FA message comprises at least one of an MS IDentification (ID), a region of a fixed resource, the bitmap index allocated to the MS, a coding scheme applied to the fixed resource, a duration for allocating the fixed resource, a start frame which fixed resource allocation is started, and an FA period.

20. The apparatus of claim 17, further comprising:
a storage for storing the bitmap information; and
a scheduler for determining whether the packets to be transmitted to the MSs in a current frame are the Rtx packets or the new packets at every transmission time in accordance with an FA period, and toggling a corresponding bit of the bitmap information, when the packets transmitted in the current frame are the new packets, and maintaining the corresponding bit of the bitmap information without alternation, when the packets are the Rtx packets.

21. The apparatus of claim 17, wherein the transmitter transmits the packets to the MSs by using the fixed resources at every transmission time in accordance with an FA period.

22. The apparatus of claim 21, further comprising a retransmission controller for evaluating a response signal fed back from the MSs and for determining whether a next packet to be transmitted to a corresponding MS is a new packet or an Rtx packet according to the response signal.

23. The apparatus of claim 17, wherein the packets to be transmitted to the MSs are Hybrid Automatic Repeat reQuest (HARQ) packets.

24. A Mobile Station (MS) apparatus in a broadband wireless communication system, the apparatus comprising:
a message reader for receiving, from a Base Station (BS), a Fixed Allocation (FA) message including bitmap index information for the MS allocated with fixed resources, wherein the bitmap index information identifies a bitmap index allocated by the BS to the MS, and the bitmap index identifies information for the MS from among bitmap information indicating whether packets to be transmitted to the MS are Retransmission (Rtx) packets or new packets, and
a receiver for receiving the bitmap information; and
a bitmap information reader for determining whether a packet received in a current frame is an Rtx packet or a new packet by verifying a bit value of the bitmap index allocated to the MS according to the bitmap information received from the receiver.

25. The apparatus of claim 24, wherein the bitmap information is periodically received at a Fixed Allocation (FA) period.

26. The apparatus of claim 24, wherein the FA message is transmitted in a start frame which fixed resource allocation is started.

27. The apparatus of claim 24, wherein the FA message comprises at least one of an MS IDentification (ID), a region of a fixed resource, the bitmap index allocated to the MS, a coding scheme applied to the fixed resource, a duration for allocating the fixed resource, a start frame which fixed resource allocation is started, and an FA period.

28. The apparatus of claim 24, wherein the bitmap reader determines the packet received in the current frame to be the Rtx packet when the verified bit value is identical to a previous received bit value, and determines the packet received in the current frame to be the new packet when the verified bit value is different from the previous received bit value.

29. The apparatus of claim 24, further comprising a decoder for performing decoding by combining packets when the packet received in the current frame is determined to be the Rtx packet, and performing decoding by using only the packet received in the current frame when the packet received in the current frame is determined to be a new packet.

30. The apparatus of claim 29, further comprising:
an error checker for checking errors in decoded data obtained from the decoder; and
a feedback generator for feeding back an error checking result obtained from the error checker to the BS.

31. The apparatus of claim 24, wherein the packets received via the fixed resources are Hybrid Automatic Repeat reQuest (HARQ) packets.

32. The apparatus of claim 24, wherein the receiver receives a packet from the BS via a fixed resource at every transmission time in accordance with an FA period.

* * * * *